United States Patent
Hess et al.

(10) Patent No.: US 12,369,562 B2
(45) Date of Patent: Jul. 29, 2025

(54) DEVICE FOR LIFTING AN ANIMAL IN A CHUTE

(71) Applicant: Appleton Steel, Appleton, WI (US)

(72) Inventors: Bryant Hess, Shiocton, WI (US); Brennen Snow, Appleton, WI (US); David Hoerning, Appleton, WI (US)

(73) Assignee: Appleton Steel, Inc., Appleton, WI (US)

( * ) Notice: Subject to any disclaimer, the term of this patent is extended or adjusted under 35 U.S.C. 154(b) by 44 days.

(21) Appl. No.: 18/204,380

(22) Filed: May 31, 2023

(65) Prior Publication Data

US 2024/0008446 A1  Jan. 11, 2024

Related U.S. Application Data

(60) Provisional application No. 63/358,549, filed on Jul. 6, 2022.

(51) Int. Cl.
*A01K 1/06* (2006.01)
*A01K 13/00* (2006.01)

(52) U.S. Cl.
CPC ............ *A01K 1/0613* (2013.01); *A01K 13/00* (2013.01)

(58) Field of Classification Search
CPC ...... A01K 1/0613; A01K 13/00; A01K 15/04; A01L 13/00
USPC .................................................. 119/601, 755
See application file for complete search history.

(56) References Cited

U.S. PATENT DOCUMENTS

| | | | | |
|---|---|---|---|---|
| 123,231 A | * | 1/1872 | Brusoe ..................... | A61D 3/00 119/726 |
| 129,832 A | * | 7/1872 | Kieler .................. | A01K 1/0613 119/735 |
| 161,825 A | * | 4/1875 | Relph .................. | A01K 1/0613 119/725 |
| 304,916 A | * | 9/1884 | Dougherty ........... | A01K 1/0613 119/725 |
| 490,053 A | * | 1/1893 | Underkofler ......... | A01K 1/0613 119/725 |
| 646,251 A | * | 3/1900 | Young .................. | A01K 1/0613 119/734 |

(Continued)

FOREIGN PATENT DOCUMENTS

| | | |
|---|---|---|
| CA | 2853020 | 11/2015 |
| CN | 213283532 U | 5/2021 |
| JP | 2020150841 A | 3/2019 |

OTHER PUBLICATIONS

M. Alsaaod et al., "The cow pedogram—Analysis of gait cycle variables allows the detection of lameness and foot pathologies," Journal of Dairy Science, vol. 100, No. 2 (Feb. 2017): 1417-1426, https://doi.org/10.3168/jds.2016-11678 and https://www.journalofdairyscience.org/article/S0022-0302(16)30846-3/fulltext.

(Continued)

*Primary Examiner* — Monica L Perry
*Assistant Examiner* — Maria E Graber
(74) *Attorney, Agent, or Firm* — Planet Lindsay, LLC; Jeffrey D. Lindsay

(57) ABSTRACT

An animal trimming chute for treating animals is described which comprises a belly band for lifting the animal in which a lifting device mounted at or near the front of the chute pulls the belly band upwards, while the sides of the chute are provided with protective shielding.

20 Claims, 5 Drawing Sheets

(56) References Cited

U.S. PATENT DOCUMENTS

| | | | | |
|---|---|---|---|---|
| 671,750 | A * | 4/1901 | Benedict | A01K 1/0613 119/725 |
| 866,003 | A * | 9/1907 | Davis | A61D 3/00 119/726 |
| 878,347 | A * | 2/1908 | Clement | A61D 3/00 119/726 |
| 1,064,367 | A * | 6/1913 | Musselman | A01K 1/0613 119/725 |
| 1,083,627 | A * | 1/1914 | McFadden | A01K 1/0613 119/725 |
| 1,233,309 | A * | 7/1917 | Tregurtha | A01K 1/0613 119/725 |
| 1,375,189 | A * | 4/1921 | Tucker | A61D 3/00 119/726 |
| 1,420,349 | A * | 6/1922 | Szabo | A01L 13/00 119/712 |
| 1,621,760 | A * | 3/1927 | Stader | A01K 1/0613 119/725 |
| 2,278,298 | A * | 3/1942 | Young | A61D 3/00 119/726 |
| 2,650,567 | A * | 9/1953 | Whitworth | A01K 1/0613 16/235 |
| 2,718,214 | A * | 9/1955 | Walker | A01L 13/00 119/726 |
| 3,208,432 | A * | 9/1965 | Fisk | A61D 3/00 312/298 |
| 3,807,361 | A * | 4/1974 | Kaplan | A01L 13/00 119/725 |
| 4,055,148 | A * | 10/1977 | Brockman | A01K 1/0613 119/723 |
| 4,214,555 | A | 7/1980 | Sawby | |
| 4,663,847 | A | 5/1987 | Van Horn | |
| 4,829,937 | A * | 5/1989 | Weelink | A01K 15/04 119/727 |
| 5,184,572 | A | 2/1993 | Meier | |
| 5,282,441 | A * | 2/1994 | Ricketts | A01K 1/0613 119/751 |
| 5,331,923 | A | 7/1994 | Mollhagen | |
| 5,640,933 | A | 6/1997 | Bradbury | |
| 5,842,443 | A * | 12/1998 | Steinfort | A01K 1/0613 119/726 |
| 6,425,351 | B1 | 7/2002 | Mollhagen | |
| 7,389,749 | B1 * | 6/2008 | Choate | A61D 3/00 119/726 |
| 7,822,695 | B2 | 10/2010 | Solomon | |
| 7,918,185 | B2 | 4/2011 | Araki et al. | |
| 8,066,179 | B2 | 11/2011 | Lowe | |
| 8,561,576 | B2 * | 10/2013 | Pingsterhaus | A01K 1/0613 119/752 |
| 9,185,881 | B1 | 11/2015 | Beavers | |
| 9,578,852 | B1 | 2/2017 | Riley | |
| 9,591,829 | B2 * | 3/2017 | Beavers | A01K 1/0613 |
| 10,194,638 | B1 * | 2/2019 | Tomsic | A01D 3/00 |
| 10,721,911 | B2 * | 7/2020 | Cassell | A01K 13/003 |
| 10,905,105 | B2 | 2/2021 | Crouthamel | |
| 10,932,451 | B2 | 3/2021 | Sharpe et al. | |
| 11,083,174 | B2 | 8/2021 | Balbian et al. | |
| 2003/0140870 | A1 | 7/2003 | Daniels | |
| 2006/0254532 | A1 | 11/2006 | Boriack et al. | |
| 2007/0017455 | A1 | 1/2007 | De Vor | |
| 2008/0223309 | A1 * | 9/2008 | Winders | A01L 13/00 119/728 |
| 2011/0132276 | A1 * | 6/2011 | Lanny | A01L 13/00 119/751 |
| 2011/0146591 | A1 | 6/2011 | Pingsterhaus | |
| 2015/0264889 | A1 | 9/2015 | Beavers | |
| 2016/0192618 | A1 | 7/2016 | Punt | |
| 2017/0354123 | A1 * | 12/2017 | Wilson | A61B 8/5223 |
| 2018/0146639 | A1 | 5/2018 | Hager | |
| 2023/0011038 | A1 * | 1/2023 | Mollhagen | A01K 1/0613 |
| 2023/0105772 | A1 | 6/2023 | Hoerning | |
| 2023/0172158 | A1 | 6/2023 | Comte | |

OTHER PUBLICATIONS

Kate Hepworth, Michael Neary, and Simon Kenyon, "Hoof Anatomy, Care and Management in Livestock," Purdue University Agricultural Communication ID-321-W, Oct. 2004, https://extension.purdue.edu/extmedia/ID/ID-321-W.pdf.

F.C. Flower and D.M. Weary, "Effect of hoof pathologies on subjective assessments of dairy cow gait," Journal of Dairy Science, vol. 89 (2006): 139-146, https://doi.org/10.3168/jds.S0022-0302(06)72077-X and https://www.journalofdairyscience.org/article/S0022-0302(06)72077-X/fulltext.

N. Chapinal and C.B. Tucker, "Validation of an automated method to count steps while cows stand on a weighing platform and its application as a measure to detect lameness," Journal of Dairy Science, vol. 95, No. 11 (2012): 6523-6528, https://pubmed.ncbi.nlm.nih.gov/22959932/. (Abstract.).

Tom Van Hertem, et al., "Implementation of an automatic 3D vision monitor for dairy cow locomotion in a commercial farm," Biosystems Engineering, vol. 173 (2018): 166-175, https://www.sciencedirect.com/science/article/abs/pii/S1537511017300570. (Abstract.).

T. Van Hertem, et al., "Lameness detection based on multivariate continuous sensing of milk yield, rumination, and neck activity," Journal of Dairy Science, vol. 96, No. 7 (2013): 4286-4298, https://www.researchgate.net/publication/236918462_Lameness_detection_based_on_multivariate_continuous_sensing_of_milk_yield_rumination_and_neck_activity.

* cited by examiner

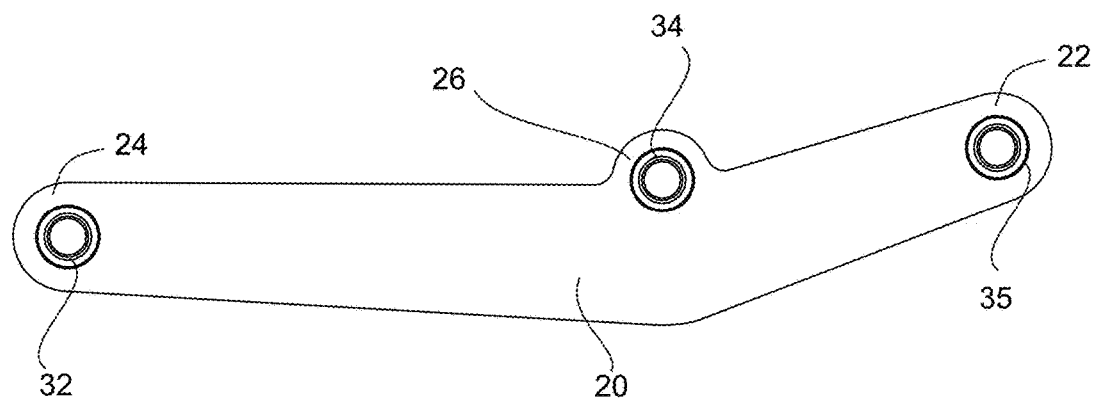
FIG. 2
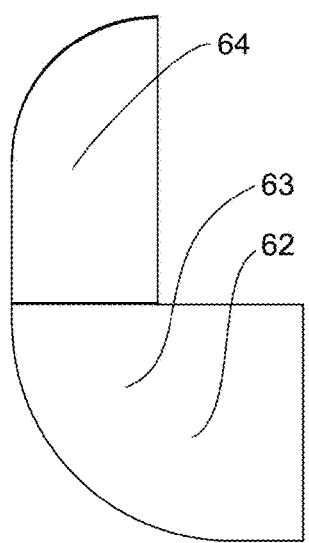 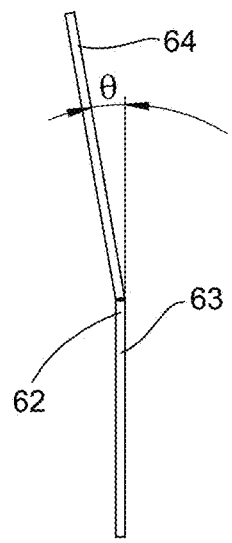 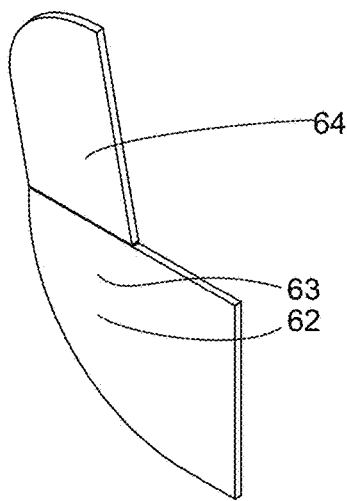
FIG. 3A  FIG. 3B  FIG. 3C

DEVICE FOR LIFTING AN ANIMAL IN A CHUTE

CLAIM TO PRIORITY

This application claims priority to U.S. patent Appl. Ser. No. 63/358,549, "Device for Lifting an Animal in a Chute," filed Jul. 6, 2022, which is hereby incorporated by reference in its entirety for all purposes.

BACKGROUND

1. Field of the Invention

This invention pertains to devices for restraining animals for hoof trimming and associated methods and systems, and in particular a device for lifting an animal.

2. Problems to Be Solved and Related Approaches

Hooved animals such as cattle, bison, sheep, goats, horses, deer and pigs may regularly require treatment of their hooves, particularly trimming, when they are not living in their natural environment. Some animals such as alpacas have nails instead of hooves, but may require trimming and care as well. Trimming or other treatments is frequently required for commercial animals such as cattle at a dairy farm or ranch, but may also be needed in other settings as well. The dairy industry in particular has come to depend on professional hoof trimming, for cattle that no longer can wander freely on rough natural landscapes and that also ingest relatively high amounts of feed tend to have rapid hoof growth that, without regular trimming, tends to lead to injury, pain, lameness, and premature death. In addition to trimming of hooves or nails, a variety of foot ailments such as foot rot may require special attention.

Hoof trimming and other treatments of animals typically require some form of restraint and often also require lifting or at least partially support the animal so that a leg or hoof be treated. One method for lifting the animal is the use of a belly band, a flexible belt, for example, that can be raised to apply a significant lifting force on the belly of the animal to safely lift and restrain an animal, allowing one or more legs to then be raised into a position suitable for treatment. The belly band may be found in chutes that are widely used for treating various animals, especially those that are part of a commercial enterprise such as dairy cattle where regular hoof trimming is vital to protect the health of the animals.

Applicants have discovered that "common knowledge" regarding lifting with hydraulic power can lead to safety problems when using a belly band in a chute. That common knowledge teaches that hydraulic pistons are most effective when pushing, not pulling, and indeed, a hydraulic piston tends to have much greater power for pushing (extending the piston along the piston) versus retracting. For an animal trimming chute, this knowledge naturally leads to the logical placement of hydraulic pistons on the midsections of the sides of chute to push a pivoting arm upwards that lifts the belly band to lift an animal. However, Applicants have discovered that this approach leads to open spaces in the chute or exposure of an animal to moving elements that are beneath the level of the upper legs, such that an agitated animal may be able to get a leg stuck in an open space or face other hazards. There is thus a long-standing unmet need for a belly band system with a powered lifting system with enhanced safety, such as being free of openings or other safety risks such as pinch points along the lower sides of the chute that might pose risks for the legs of animals. Through the careful questioning of "common knowledge" followed by exploring the potential for improved systems through innovation was the nature of the problem revealed and novel solutions developed.

There is also a need for improved lifting and restraint systems that can increase the ability of a worker to safely work with an animal with reduced risk of injury to the animal or the worker. There is also a need for improved systems in treating and preventing the injuries and maladies that can lead to lameness in an animal.

The needs described above are provided by way of example only. It should be understood that while the various methods, devices, and systems described below may each provide useful solutions to one or more of these needs, not every invention as claimed need individually fulfill all or any specific one of these exemplary needs.

Unless otherwise specified or clearly inappropriate in context, subsequent references to "hoof trimming" should typically be understood to include not only direct trimming of the hoof, but to potentially include nail trimming and other treatments of the foot or lower leg of an animal.

SUMMARY

Applicant has discovered that a counterintuitive approach in which hydraulic pistons pull rather than push can provide a lifting system with a geometry that brings enhanced safety features. In this approach, hydraulic pistons or other lifting devices may mounted toward the front of the chute such as being attached to a front frame element, and may descend from above to connect to the belly band.

The upward lifting motion driven the pulling of a lifting device such as a hydraulic element may be guided by a pivot arm guide in cooperative association with the pivot arm such that the guide deflects the pivot arm inwards toward the center of the chute during lifting.

In some aspects, the chute may comprise a pivot arm mounted at or near the front of chute that swings upwards to lift the belly band and in so doing, the arc of pivot arm defines a path of motion for the belly band that at least initially moves the belly band slightly backwards, away from the front of the chute and toward the rear of the chute as it raises. Applicants have found such motion to provide unexpected benefits in the use and operation of the belly band, for if an animal is standing on the belly band as it begins its motion, it can readily slip away from the hooves of the animal and it is easier for the animal to free a leg or legs from the rising belly band if they are in the way. This can reduce the occasional need of an operator to lower the belly band and reposition an animal before trying to life it again, and can reduce anxiety for the animal.

At the same time, Applicant has also discovered that relative to a belly band lifting system that pushes from below to move a midsection-mounted pivot arm upwards with a low-mounted hydraulic piston, the improvement described herein can better protect the animal from potential dangers on the sides of the chute due to openings or moving elements that can engage or injure an animal's leg. Applicant's novel design of a chute with a top- and forward-mounted, upward pulling lifting system makes it possible to have chute sides with protective shielding below a predetermined height substantially without openings apart from the front open area used for trimming of the front legs, or at least without openings large enough to cause risk of injury to an animal from the openings. Thus, the sides of the chutes may be covered with a shielding such as rigid sheeting or other protective material substantially extending from the rear gate to the front trimming area below a height such as 48 inches (roughly 120 cm), 40 inches (100 cm), 36 inches (90 cm), 30 inches (76 cm), or 24 inches (60 cm) above the floor of the chute that extends to the floor or slightly above the floor; e.g., within 8 inches (20 cm), 6 inches (15 cm), 4 inches (10 cm), or 2 inches (5 cm) from the floor). Openings where an animal's leg can become stuck or trapped are essentially eliminated with the improved design.

Thus, in one aspect, an animal lifting system is provided comprising a chute having a frame, an entrance, an exit with an exit gate, side walls that are substantially closed to the legs of the animal, a belly belt connected to at least one pivotable arm connected to at least one hydraulic piston, the hydraulic piston placed above the level of the legs of the animal and adapted to lift the at least one pivot arm upwards by retracting the piston to thereby lift the belly band to apply a lifting force to the belly of the animal. In one example, each end of a belly band is connected to opposing pivot arms mounted on either side of the chute, wherein the two pivot arms are adapted to be pulled upwards by a hydraulic piston attached to each pivotable arm. The body of the piston is mounted above the pivotable arm to generally keep it and associated devices out of range of the animal's legs.

In another aspect, an animal lifting system is provided comprising a chute having a frame, an entrance, an exit with an exit gate, side walls that are substantially closed to the legs of the animal, a belly belt connected to at least one pivot arm connected to at least one hydraulic piston, wherein the pivot arm is adapted to initially move the belly band backwards away from the exit gate.

In one aspect, the belly band may be made from one or more flexible materials such as leather, rubber, polymers including fiber-reinforced or wire-reinforced polymers, woven meshes including metallic meshes, and the like. It may have a width of, for example, at least 3 inches (8 cm), 4 inches (10 cm), 5 inches (13 cm), 6 inches (15 cm), or 7 inches (18 cm), such as from 3 inches (8 cm) to 12 inches (30 cm), from 4 inches (10 cm) to 10 inches (25 cm), from 3 inches (8 cm) to 8 inches (20 cm), and the like.

In another aspect, a chute for animal treatment is provided having a frame with an entrance at the rear of the frame (the rear section), an exit gate at the front of the frame (the front section) adapted to restrain forward motion of the animal until fully opened, and two side sections attached to the respective sides of the frame, at least one leg grasper attached to the front section of the frame adapted to restrain the animal's leg and lift it upwards for treatment, the chute further comprising a belly band attached to opposing pivot arms mounted near or on the front section of the frame and extending along the sides of the chute (or the side sections), operatively associated with a powered lifting mechanism connected to the frame and mounted above the belly band at rest (e.g., it may be attached to an upper section of the frame), whereby retraction of one or more rods, or more generally, an extensible and retractable linkage, in association with the powered lifting mechanism, pulls the pivot arms upward to cause the belly band to lift an animal in the chute, the side of the chute comprising protective shielding at a height of at least 4 feet (1.2 m), 3 feet (0.9 m), or at least as great as the front leg height of the animal, and extending from the entrance of the chute to a distance of at least 60% or 70% of the length of the animal, the protective shielding being free of openings that could catch the leg of an animal prior to approaching the exit gate, such that a front opening remains available for grasping and treating a front leg of the animal.

The extensible and retractable linkage that may be used to lift the pivot arm and the attached belly band may involve any suitable source of power such as hydraulic pistons driven by hydraulic cylinders, pneumatic pistons driven by compressed air (air cylinders) or other gas, steel cables or chains that can be wound or unwound as by a winch or other winding device, electric actuators, a mechanical crank or lever system (e.g., a hand-wound or motor-driven crank that winds or unwinds a steel cable to raise or lower the pivot arm), a screw (or lead screw) mechanism that translated the rotation of a rod into motion up or down, a spring and damper system that uses the potential energy stored in a spring and a damper to control the movement of a rod, often aided with another power source, etc. Any of the lifting systems described herein may be used alone or in combination with other lifting or movement systems to life the pivot arm or to move any other components of the trimming chute, as desired.

As used herein, "substantially closed to the leg of the animal" means that for the target animal of typical size, the side walls of the chute are substantially closed to the legs of the animal by shielding material, such that the animal cannot readily put a leg through an opening on the side wall. The shielding material may be a solid material such as sheet metal or plastic shielding (e.g., Plexiglass), but the shielding material may also be porous with small openings, such as a mesh or apertured material, that may, for example, be at least 60% closed, or at least 75% closed, 85% closed, 90% closed, 95% closed, or 98% closed, or essentially 100% closed. A portion of a sidewall is considered closed if it is made of a solid material such as sheet metal, solid plastic, etc., but may also be closed for purposes herein if it has fine openings that allow for the passage of light, water for cleaning, or air while being too small to catch a leg of an animal or to allow a leg to pass therethrough. In general, a surface of a side panel may be considered substantially closed to the legs of the animal if no opening exists that would permit a rod with a diameter of 2 inches (5 cm), 1.5 inches (4 cm), 1 inch (2.5 cm), or 0.5 inches (1.3 cm), to pass through the side panel in the closed region. A grill, mesh, screen, etc. with many fine openings may suffice in presenting a surface free of openings that could pose a risk to an animal while still being lightweight or capable of allowing light, air, or water to pass through the surface.

The shielding of the side walls may be a single piece of material on each side, or may be comprised of two or more sections of material on each side, including overlapping sections, sections of different materials, different heights, etc.

The belly band system described herein may be combined with other elements such as the two-stage grasper and other mechanisms described in U.S. patent application Ser. No. 17/721,289, "Grasper for Hoof Trimming," filed Apr. 14, 2022 by Bryant Hess et al., hereby incorporated by reference in its entirety.

Also contemplated herein are methods of converting existing animal treatment chutes which lack the animal lifting system described herein. Such methods may include dismantling or removing other lifting devices and installing a lifting device connected to a belly band to provide the features described and claimed herein. This may involve a number of steps such as mounting a lifting device to be anchored to a top, forward portion of the frame, mounting a pivot arm on a suitable, support member toward the front section of the frame, attaching the belly band, providing protective shielding along the sides of the chute, especially in the region where a previously installed animal lifting device may have been provided, etc.

BRIEF DESCRIPTION OF THE DRAWINGS

FIG. 2 depicts details of one version of a pivot arm.

FIG. 3 depicts details of a guide members used to direct the transverse position of a pivot arm while lifting an animal.

DETAILED DESCRIPTION

Figure 1:
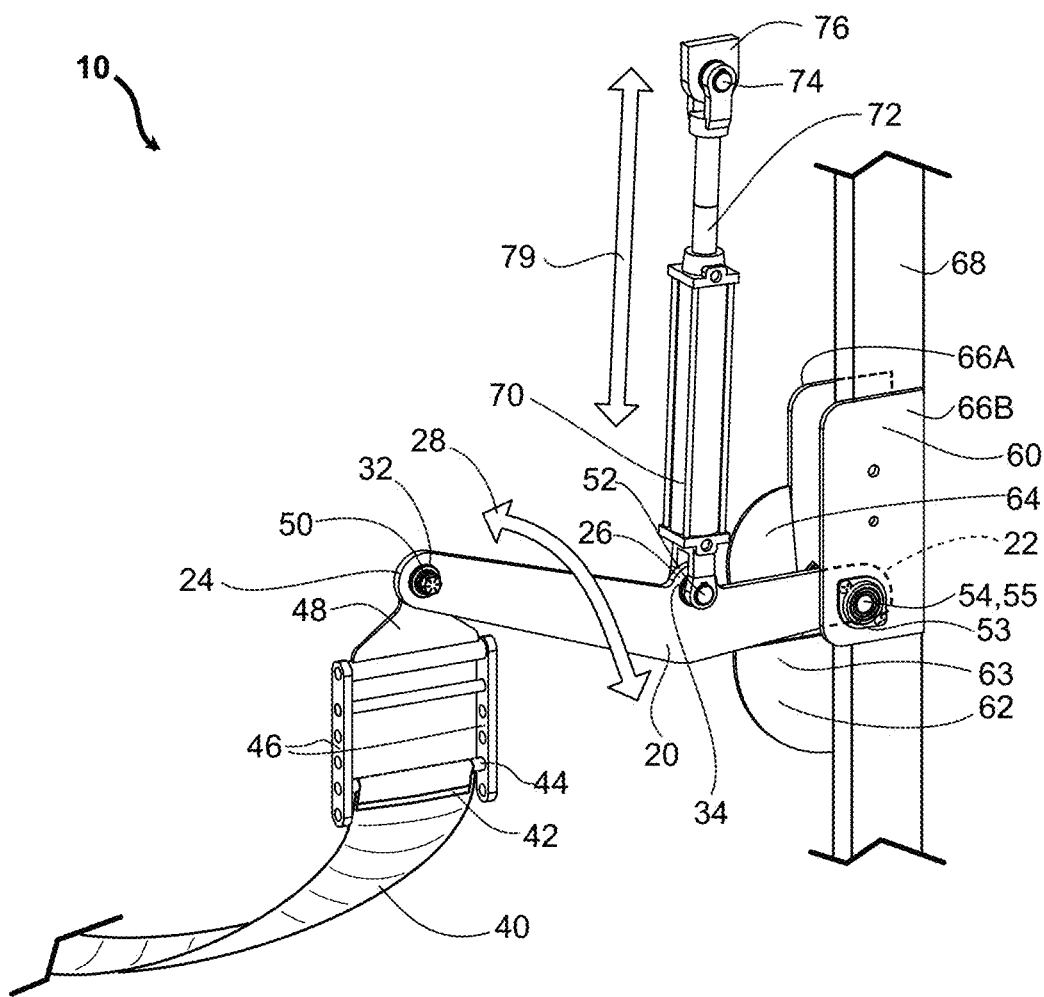
FIG. 1 a version of a lifting system for raising an animal with a belly band.

FIG. 1 depicts an animal lifting system 10 that may be installed into a hoof trimming chute (not shown) or other treatment system. The animal lifting system 10 comprises a belly band 40 connected to a pivot arm 20, which can pivot up or down about a pivot shaft 54 connecting the pivot arm 20 to the mount 60, wherein the pivot shaft 54 passes through a swivel joint 53 (or alternatively, a hole) in the mount 60 and also through a swivel joint or hole (not shown) in the first end 22 of the pivot arm 20. The mount 60 comprises opposing brackets 66A, 66B that support the mount 60 on a support member 68 which may be part of the front frame of a trimming chute (not shown), or in other words, may be attached to, or be part of, the front section of a trimming chute (not shown). As depicted, if the lifting system 10 were installed in a hoof trimming chute or other chute (not shown), the support member 68 would be on the right front side of the chute. In some versions, the mount 60 comprises a guide member 62, which may comprise a lower guide member 63 at a first angle and an upper guide member 64 at a second angle relative to the vertical axis. The guide member 62 as depicted has a lower guide member 63 that may be substantially vertical, while the upper guide member 64 departs from the vertical axis such that the pivot arm 20 will move inward (toward the middle of the belly band 40 as the pivot arm 20 moves upward in contact with the upper guide member 64. In related versions, the guide member 62 may be positioned at a constant single angle or may define a curved arc (not shown). In any case, it directs the motion of the pivot arm 20 in terms of its traverse position relative to the horizontal axis normal to the pivot arm 20 or relative to the animal being lifted (not shown), such that traverse motion during lifting may better support and constrain the animal and reduce stress on the connection about the pivot shaft 54. The amount of inward motion as the pivot arm 20 moves from a downward position to a fully raised position may be from 1 inch (2.5 cm) to 20 inches (51 cm), such as from 1 inch (2.5 cm) to 15 inches (38 cm), 2 inches (5 cm) to 12 inches (30 cm), or 3 inches (8 cm) to 10 inches (25 cm).

A second end 24 of the pivot arm 20 supports a belly band connection 50, depicted here as a first bolt passing through a swivel joint 32 (alternatively, this could be a hole or other means for making a connection) that holds a belly band support 48 comprising sidewalls 46 that can hold a cross rod 44 in place to support an end 42 of the belly band 40.

A midsection 26 of the support arm 20 has a midsection swivel joint 34 (alternatively, this could be a hole through which a bolt passes or other means for making a connection) that to provide a lifting device connector 52 to link the pivot arm 20 to a lifting device 70 such as hydraulic cylinder, an electric actuator, etc. The lifting device 70 is mounted above the belly band 40, or at least above the belly band 40 in resting mode (when the pivot art 20 is in a lowered position), and may be attached to an upper portion of the chute's frame (not shown), including near or on the front portion of the frame. A movable rod 72 (more generally, an extensible and retractable linkage, in association with the lifting device 70) can be retracted within the lifting device 70 to lift the pivot arm 20 or released to allow the pivot arm 20 to go downward. The movable rod 72 is attached to a lifting device mount 76 via a rotatable linkage 74 or other connection means.

A first arrow 28 shows how the pivot arm 20 may move transversely as tit is lifted or lowered, and a second arrow 79 shows how the movable rod can move up or down relative to the lifting device 70. The vertical distance traversed by the second end 24 of the pivot arm 20 will depend on the scale of the lifting system 10 and the animals that are intended to be treated, but can be any suitable distance. For cattle or horses, for example, the distance may be at least 10 inches (25 cm), such as from 10 inches (25 cm) to 35 inches (89 cm), 10 inches (25 cm) to 26 inches (66 cm), 12 inches (30.5 cm) to 28 inches (71 cm), etc.

The pivot arm 20 and other components may be made from any suitable materials such as stainless steel, carbon steel, aluminum, titanium, etc., or any other suitable alloys. The components may also be made, when suitable, from composite materials such as reinforced polymers, carbon composites, etc.

FIG. 2 depicts a view of pivot arm 20 showing its first end with a swivel joint 35 adapted to receive the pivot shaft 54 (not shown) of FIG. 1. Also shown is the second end 24 and its swivel joint 32 which supports the belly band connection 50 (not shown) of FIG. 1. The midsection 26 provides a midsection swivel joint 34 which engages with the above-mounted lifting device (not shown) of FIG. 1 that is adapted to pull the pivot arm 20 upwards to raise the belly band 40 (not shown) of FIG. 1. The pivot arm 20 as depicted is substantially flat with its three swivel joints 32, 34, 35 all in a common plane, but it may be curved such that the swivel joints are no longer in a plane. It may be made of any suitable material such as steel or other metals or composite materials.

FIGS. 3A, 3B, and 3C show details of a guide 62 used to guide the transverse motion of the pivot arm 20 as it moves vertically, with the guide 62 shown from 3 angles. As depicted, the guide 62 is adapted for use on a pivot arm 20 (not shown) mounted on the right side of a chute (not shown). The guide 62 is positioned to the left of the pivot arm 20 (not shown). FIG. 3A shows a side view of the guide 62, having a lower guide member 63 an upper guide member 64. FIG. 3B shows and end view revealing that the upper guide member 63 may be in a plane at an angle θ relative to the plane of the lower guide member 64. The angle θ may be, for example, from 2 degrees to 40 degrees, from 4 degrees to 30 degrees, from 3 degrees to 25 degrees, from 3 degrees to 15 degrees, or from 5 degrees to 20 degrees. In this version, the swivel arm 20 (not shown) may, as it rises above the lower guide member 63 and begins to contact the upper guide member 64, follow the upper guide member 64 such that the transverse position of the arm moves inward toward the animal (not shown) and toward the center line of the trimming chute (not shown). FIG. 3C is a perspective view of the guide member 64.

In the simple aspect shown both the upper guide member 64 and the lower guide member 63 define planes, but more complex geometries are possible. In one aspect (not shown), the guide member 62 is substantially at a single angle defining a plane without distinct upper and lower guide members 63, 64, and on another aspect the guide member 62 is curved, such as a curve with an increasing slope to accelerate the inward motion of the pivot arm 20 (not shown) as it is raised.

Figure 4:
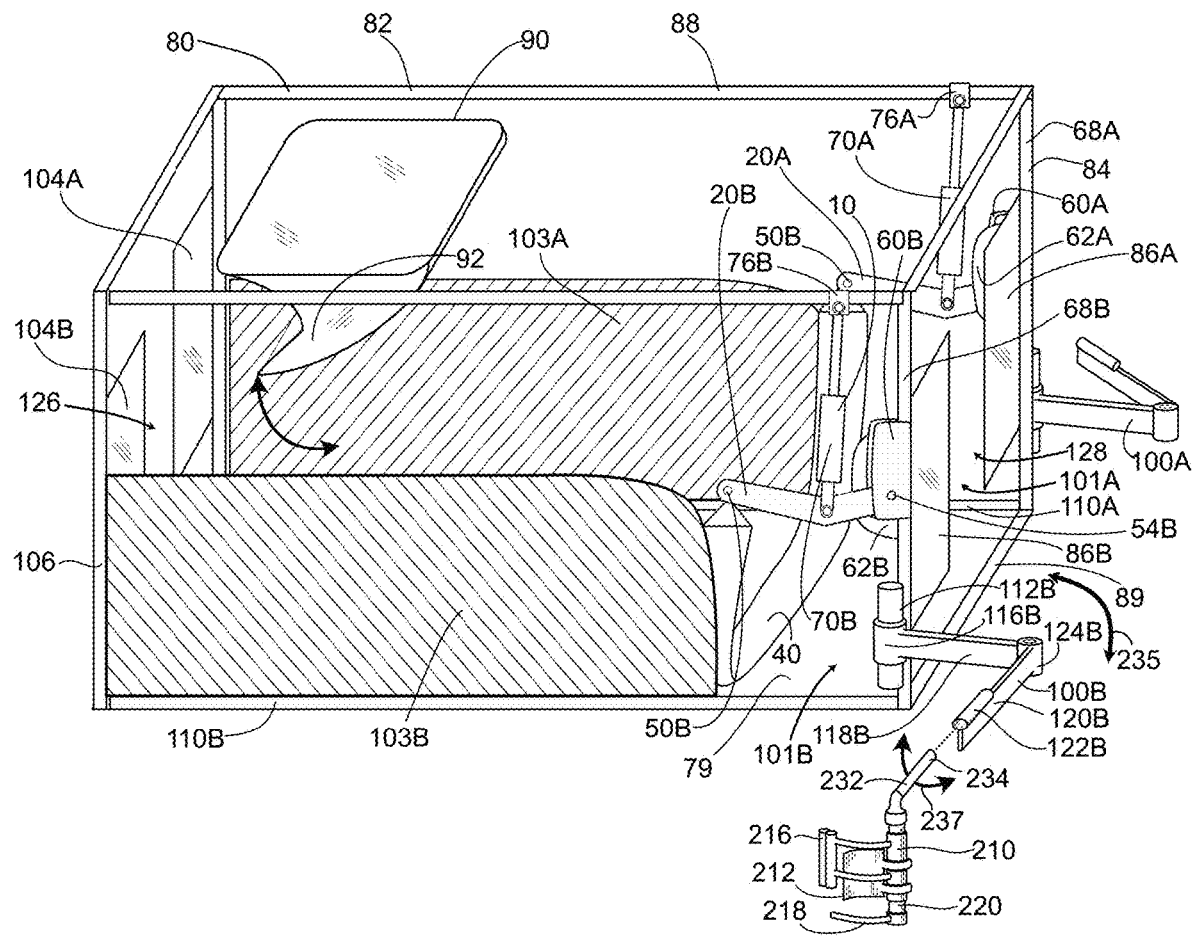
FIG. 4 depicts a chute comprising a lifting system.

FIG. 4 depicts a cattle chute 80 with a lifting system 10 installed therein for lifting an animal (not shown). The chute 80 comprises a frame 82, but with many support structures and peripheral elements not shown to more clearly show certain components. The frame 82 comprises an upper section 88, a rear section 106 which supports an entrance gate 126 with entrance doors 104A, 104B, a front section 89 which supports an exit gate 128 having exit doors 86A, 86B, side sections or portions 110A, 110B, etc. Along the side sections 110A, 110B, protective shielding 103A, 103B, respectively, is mounted to help guide the animal and reduce the risk of injury, particularly by eliminating access to opens through which a leg might be placed. The protective shielding is generally in place below a predetermined height above the floor 79 with a height relative to the floor 79 such as from 22 inches (56 cm) to 60 inches (150 cm), 24 inches (60 cm) to 50 inches (127 cm), 24 inches (60 cm) to 48 inches (120 cm), 24 inches (60 cm) to 40 inches (100 cm), 24 inches (60 cm) to 36 inches (90 cm), etc. (In the case of a floor 79 of uneven height, the vertical position of the floor 79 can be taken as the average height of the four regions expected to be occupied by the hooves or feet of an animal when standing on the floor 79 in position ready to receive treatment.) The protective shielding may extend along a majority of the chute 80, but may provide a front lateral opening 101A, 101B on each side to provide space for treating the front legs, typically with the use of a grasper 210 such as the version shown here, or any other suitable grasper to constrain and lift the leg of an animal for hoof trimming or other treatments.

Mounted on the frame 82, and in particular on or near the front section 89 and/or on the front portions of the upper section 88 of the frame and generally along the front opposing side sections 110A, 110B of the frame 82, is a lifting system 10 adapted to raise and lower a belly band 40 that is adapted to partially lift an animal (not shown) while standing in the chute 80 by supporting the brisket or belly portion of the animal. Components on the right side of the lifting device 10 such as the pivot arm 20A are mirrored by similarly enumerated items but with the trailing "A" replaced with "B," such as the pivot arm 20B on the left side of the chute 80. Thus, right side components of the lifting device include a mount 60A attached to a support member 68A in the front section 89 of the frame 82 with an optional guide 62A at the side of the mount 60A to influence the transverse position of the pivot arm 20A as a function of its vertical position. Thus, in some versions, the guide allows the pivot arm 20A to move slightly toward the center line of the chute 80 as it is elevated, the center line being a line not shown extending from the center of the rear section to the center of the front section of the chute 80, intended to generally refer to the central portion of the chute 80 as opposed to the side sections 110A, 110B thereof.

The guide 62A may also provide stability or support for the pivot arm 20A in response to transverse components of the force vector from the weight of the animal (not shown). The pivot arm 20A is connected to the belly band 40 via a belly band connection 50A at a position on the pivot arm 20A remote from the mount 60A, where the pivot arm 20A is rotatably mounted about a pivot shaft 54A. In the version shown here, a lifting device 70A such as a hydraulic piston is connected to the pivt arm 20A at a location between the mount 60A and the belly band connection 50A to the belly band 40, but other configurations are possible. For example, the bellyband connection 50A could be between the pivot shaft 54A and the lifting device connector 52A to the lifting device 70A. In some aspects, a plurality of connections points (not shown) for either the bellyband connector 50A and the lifting device connector 52A could be provided along the length of the pivot arm 20A, or provided by the selection of pivot arms 20A, 20B from multiple interchangeable pivot arms (not shown) with various configurations, to allow the configuration of the lifting device 10 to be rapidly changed as needed for various settings such different animal types, different animal weights, etc.

As shown, the lifting device 70A is generally above the pivot arm 20A. In the version shown, the lifting device 70A is depicted as a hydraulic cylinder that performs a lifting action by contracting. An electric actuator may also be used and would operate in a similar fashion, with contraction being used to provide the lifting force required. With this arrangement, the lifting device 70A and the pivot arm 20A do not require openings in the shielding 103A, 103B along the opposing sides 110A, 110B, respectively, of the chute 80. There is a front opening 101B on the right side and 101A on the left side to permit hoof trimming or other operations on the front legs of the animal (not shown) with the help of a grasper 210, here shown only on the right side, though graspers may be present on both sides of the chute 80.

The chute 80 comprises a "comealong" 90 mounted on the top section of the chute 80 having a rotatable lower portion 92 that can rotate downward and toward the front section 89 to help drive an animal forward. Also attached to the frame 82 near the front section 89 thereof are a pair of shoulder-mounted front-leg grasper support frames 100A, 100B, details for which are enumerated for the foremost support frame 100B. The support frame 100B is attached to a shoulder mount 112B having a shoulder pivot 116B connected to an upper arm section 118B, which is connected to an elbow joint 124B that connects to a forearm section 120B which can rotate relative to the upper arm section 118B via the elbow joint 124B. The forearm section comprises an open cylindrical mount 122B (though many other configurations for rotatable mounts could be used) which is adapted to receive the cylindrical mounting rod 234 of the mounting element 232 of the grasper 210 shown near but not yet connected to the grasper support frame 100B. Once the cylindrical mounting rod 234 is inserted into the cylindrical mount 122B, the grasper 210 that hangs from the cylindrical mounting rod 234 can be swung into or near the front lateral opening 101B of the chute 80 through the rotation of the grasper support frame 100B about the shoulder mount 112B and the elbow joint 124B to place the open grasper 210 over the leg of an animal (not shown). Arrow 235 shows an example of the motion of the grasper support frame 100B, while arrow 237 shows another mode of rotation of the grasper 210 about the cylindrical mount 122B. Hydraulic pistons (not shown) or other means can be used to adjust the position of the upper stage 216 and the lower stage 218, and belts (not shown) can be used to firmly hold the upper stage 216 and the lower stage 218 in effective clamping positions. At that point, the grasper 210 can be rotated upward relative to the cylindrical mount 122 to a relatively horizontal position in order to bend the lower leg of an animal about the knee. This upward motion of the grasper 210 can be achieved using a hydraulic cylinder, pneumatic devices, electrical drives, or other means to apply force to ropes, cables, chains, belts, or other connections (not shown) between the hydraulic cylinder and the grasper 210 to apply sufficient force to lift the grasper 120 and the lower leg of the animal into a suitable position for hoof trimming or other treatments. Once the treatment is complete, the hydraulic or other force or restraint is relaxed, allowing the grasper 210 to swing back down such that the animal's leg is again in the normal standing position, and the belts can be released and the upper stage 216 and lower stage 218 opened to allow the grasper 210 to release the leg, after which the grasper 210 can be rotated back out of the chute 80 to no longer impede animal motion once the front doors 86A, 86B are opened.

Many versions of the gates 86A, 86B, 104A, 104B and other components can be considered. For example, automated devices (not shown) may be used to control opening and closing of the gates, wherein electric eyes, cameras, lasers, load cells, and other means may be used to detect the location of an animal (not shown) and to then automatically adjust the positions of said gates 86A, 86B, 104A, 104B or other components. The gates 86A, 86B may be oriented at an angle relative to the front plane of the chute 80 and may travel in tracks (not shown) to control the position of the gates. Other components not shown for the chute 80 can include wheels on which the chute is mounted, ramps leading to the entrance gate and away from the exit gate, power tools and other devices for trimming, a variety of controls for moving components (gates 126 and 128, the comealong 90, the lifting system 10, etc.), lights, sensors, and controls for electricity, hydraulic power, lighting, air or water flow, etc.

In one version, an animal trimming chute 80 such as a cattle trimming chute is provided having a frame 82 having protective shielding 103A, 103B along the opposing sides 110A, 110B, respectively, of the chute 80, wherein the shielding 103A, 103B is free of openings that could lead to injury of a leg of the animal being treated apart from the front lateral openings 101A, 101B through which the front legs of the animal may be treated. The front lateral openings 101A, 101B may occupy less than 50% of the length of the chute 80. Here the length of the chute 80 is defined as the distance between the exit gate 128 and either the rear of the frame 106 or the entrance gate 126, whichever is closer to the exit gate 128. Thus, the front lateral openings 101A, 101B may extend across a fraction of the chute length such as from for 10% to 50%, 10% to 40%, 10% to 30%, 10% to 25%, 15% to 35%, 15% to 28%, etc., of the chute length. The front lateral openings 101A, 101B need not be completely open and may still provide some protective shielding, but are open enough for effective access to the animal's legs for treatment.

Rear graspers may also be provided (not shown) for treating the rear legs, but may be adapted to use openings in the ear gate to provide access.

The openings for treatment of the legs, whether front legs or rear legs, may also be adjustable and switchable between open and closed states. For example, a sliding door design or other retractable doors, including doors materials that roll up, telescope, or remain planar, may be used to provide shielding as the animal enters, and then to only open the area needed for treatment, after which the opening may be closed if desired. The protective shielding may also be adjustable in terms of height and length in order to optimize shielding based on the animals being treated or their treatment needs. Thus in some aspects, the shielding may be movable up or down to adjust height, or backwards and forward to adjust the extend of the front lateral openings or rear openings. It may be divided into sections, some that can easily be raised or lowered to adjust the height of shielding, and others that may be adapted to roll, slide, or otherwise move forward or back to adjust openings in the shielding at the front and optionally the read of the chute. There may also be replaceable sections that can be readily swapped for sections of greater or lesser dimensions as needed.

Thus, in use, an animal can enter the chute 80 at the rear of the frame 82 and walk toward exit gate 128 at the front of the chute, where the exit doors 86A, 86B can engage with the shoulder to allow the head to project past the exit gate 128 while blocking further forward motion of the animal. As the animal enters the trimming chute 80, a "comealong" 90 device near the rear of the frame 82 can move into place to gently push the animal forward from behind while preventing backward retreat from the chute. The flooring (not shown), the comealong 90 and the belly band 40 or lifting system 10 may be instrumented with load cells, accelerometers, etc., to monitor animal load and motion. The chute 80 or more specifically, for example, the belly band 40 or clamping elements of the grasper 210 (e.g., the upper and/or lower stage) may also be instrumented with cardiovascular monitors or sensors such as a pulse detector, EKG tools, blood pressure measurement devices, and a blood oxygen sensor or other medical sensors to monitor the health and stress levels of an animal.

The belly band 40, such as a band of a flexible material such as rubber, cloth, or leather may be lying on the floor of the chute 80 as the animal enters, but once the animal has moved forward and is in the proper position, the belly band 40 may be automatically or manually raised with hydraulics, electric motors, pneumatic means, screw systems, winches and the like, manual use of ropes and pulleys, etc., to engage with the belly of the animal (e.g., the brisket region of a cow) and support the animal.

Complete lifting off the floor is generally not needed but could be done with assistance from the belly band 40 if desired. Once supported with the belly band 40, front legs (not shown) may be trimmed using the grasper 210, with one leg raised or both front legs raised at the same time. The rear legs may be trimmed as well using a similar grasper (not shown) or by using systems of belts and ropes that pull rear legs to bring one hoof at a time, or both hooves simultaneously, to an elevated position suitable for trimming. All such actions may be enhanced with hydraulics or other power sources, and motions can be automated or activated with simple actions such as pressing a button, issuing a voice command, etc.

The grasper 210 as it contacts an animal may typically be in an initially vertical position in which the axis of rotation of the upper stage 216 is substantially vertical, but after the upper and lower stage 218 are activated to hold the animal's leg in place, the grasper 210 may then be rotated by roughly 90 degrees or from about 45 to 130 degrees to bend the leg into position for hoof trimming. This may be assisted by the use of a hydraulic cylinder mounted on the frame 82 of the chute 80 or by other means to pull ropes, chains, or belts that turn to grasper 210 to the proper position.

In one version, a handle on the grasper 210 also comprises at least one control (not shown) for activating motion control equipment to automatically move the grasper to a desired position, thereby easing the burden on a trimmer in moving an animal leg into position for trimming.

In some versions, the grasper 210 is enhanced with data from various sensors (not shown) to improve operation. For example, strain gauges, load cells, accelerometers, motion detectors, position detectors and related tools associated with, for example, the upper stage 216 (e.g., the broad clamping surface), lower stage 218 (e.g., the relatively narrow clamping surface), and/or knee board 212 may be used to measure the force the animal is applying to resist restraint of a leg to ensure that adequate clamping pressure is applied. Such measurements in combination with automated controls can be used to release and reapply clamping force in the upper stage 216 in order to reposition a leg by momentarily relaxing the clamping force and making an adjustment in position. Doing this while the animal is already trying to move the leg could result in excessive motion of the leg, but with proper control the correct placement of the leg can be achieved with the devices, systems and methods disclosed herein.

In some versions, the chute 80 comprises or is operably associated with an ultrasonic system (not shown) for measuring characteristics of the hoof or other regions of the leg of an animal or other parts of the animal. The ultrasonic system comprises at least one ultrasonic head, and in one version the grasper itself comprises or is associated with an ultrasonic head, such as a head mounted on a clamping surface of the grasper 210 or cooperating with a clamping surface, wherein once the animal is secure, the head is in contact with the hoof, or can readily be moved into contact with the hoof for scanning in multiple positions if desired.

Other sensor technologies can also be associated with the grasper 210 or the chute 80, such as infrared imaging and other optical sensors and measurement methods, microwave imaging, x-ray systems with appropriate safety shielding, ultrasonic imaging, etc. (not shown). Acquisition, processing, storage, management, and application of the data so obtained can be handled using one or more processors in communication with one or more database servers or database systems, in cooperation with a module for animal identification (e.g., optical or electronic scanning of animal tags, biometric scans, and other recognition and identification tools), health and wellness diagnostic and forecasting tools. Communication between sensors, chute instrumentation, and a central database controller may be achieved using any suitable networking system or protocol such as WIFI, Ethernet, Bluetooth, fiber ADSL, VDSL, satellite or cellular communications including 2G, 3G, 4G, 5G, 6G, etc. protocols, BACnet systems, and the like.

In other versions, the chute 80 is part of a smart trimming system that applies data obtained from one or more sensors relevant to animal health to enhance the hoof trimming operation or the treatment applied by a trimmer. Such a smart trimming system may comprise a trimming chute 80 having a chute frame 82, one or more graspers 210 movably attached to the chute frame 82 for grasping an animal leg and moving the hoof in position for a hoof trimmer to effectively treat the hoof, a motion control system (not shown) adapted to assist or control the motion of components such as the grasper and upper stage and lower stage via hydraulics, pneumatics, electronic actuators or motors, or other motion and position regulating tools, and a processor (not shown) that receives data from one or more sensors and or one or more databases to obtain information pertaining to one or more animal characteristics relevant to hoof trimming practice such as hoof thickness, hoof health, leg health, animal pain levels, posture, gait, stress factors, load distribution, body temperature, agitation, animal eating habits, health record, etc., and in response to the data, enhancing the trimming operation by at least one of (1) providing instructions to the trimmer via electronic, visual, audible, or other means for special adjustments or procedures needed for an individual animal, (2) adjusting settings or behavior of one or more components of the trimming chute, such as modifying the clamping position of the upper stage of the grasper based on information received by the processor or modifying the clamping pressure or speed of motion of the grasper when it is turned to bend a leg into position, etc., and (3) tagging (digitally/virtually in an electronic record or physically) or calling for the tagging of an animal such that the animal will be slated for additional therapy or treatment, including adjustments in diet, shelter, exercise, medication, gene therapy, veterinary care, etc., beyond what takes place in the chute 80.

In one version, the smart trimming system comprises a trimming chute 80 with a belly band 40 for supporting an animal during hoof trimming, wherein the belly band 40 is initially on the floor of the chute as the animal walks into the chuteb 80, but once the animal's front legs have moved past the belly band, a lifting system 10 connected to the opposing ends of the belly band 40 automatically begin lifting the belly band to provide desired animal support. This may be achieved with a control system that operates hydraulics, linear actuators, motors, or pneumatics, for example, that are operably associated with the belly band. The control system may receive data from load cells in the floor of the chute, a camera viewing the interior of the chute or the legs of the animals, an ultrasonic or photoelectric motion detector, a photo eye, microphones (e.g., for voice or sound analysis of the animal that may indicate pain), and other suitable sensors (not shown). Once the sensor output indicates that the animal's front legs have moved past the belly band 40, the lifting of the belly band 40 to a suitable height or suitable load level can be applied.

Such control systems with one or more sensors assisting in the actuation of various components of the chute 80 may be especially helpful in improving efficiency of a hoof trimming operation by more quickly bringing the animal to a suitable position for treatment and by more quickly activating the exit gate 128 that keeps an animal from exiting, while allowing the head of the animal to extend outside the chute, restraining the animals at the shoulders. Such systems, including those known as the Texas head gate, typically require precise timing by operators of trimming chutes to ensure that the exit gate 128 is closed properly as the animal approaches the exit to block the shoulders. The use of rapid response gates with electronic or other actuators can improve accuracy, reduce the risk of an animal prematurely leaving the chute, reduce the risk of injury, and reduce animal agitation in the chute.

The graspers 210 described herein may typically be used for the front legs. Trimming of the rear hooves may be done by a gripper built into the comealong 90 that uses ropes, for example, to pull a rear hoof into place for efficient trimming. Graspers 210 as described herein may be used for rear legs as well when desired or needed.

The motion of the grasper and many other components in complete animal trimming chutes for hoof trimming can be provided by any combination of hydraulics, manual power (e.g., the pulling of ropes in rope and pulley systems by hand), electric actuators such as electric linear drives, electric motors, electric pistons, etc., as well as pneumatic systems or any other systems for applying force or driving motion.

Figure 5:
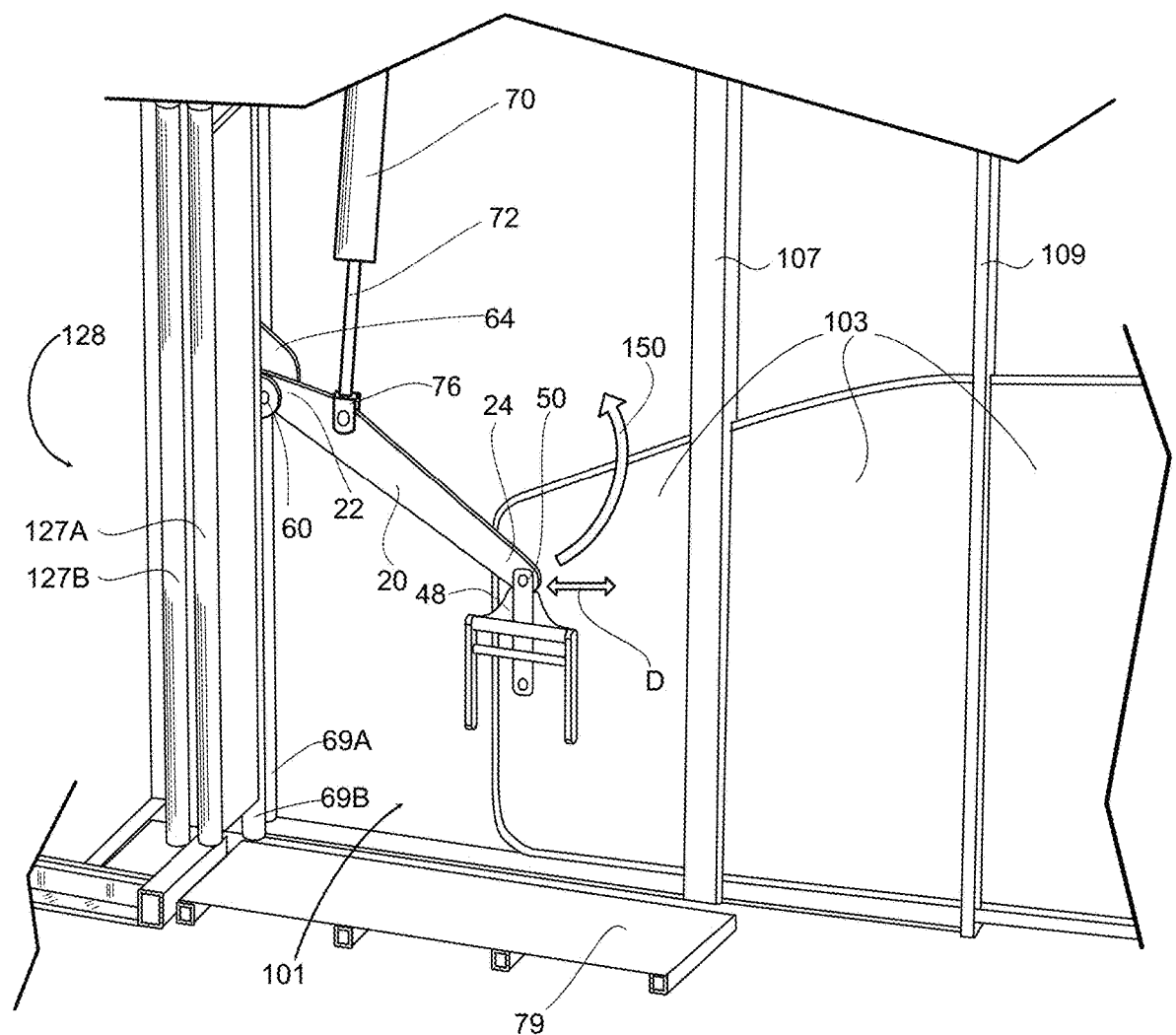
FIG. 5 is a view of one portion of one aspect of a chute showing a version of a lifting system.

FIG. 5 depicts another aspect of an animal treatment chute 80 showing a sectional view of the front right side as viewed from the inside. Vertical frame members 69A, 69B support a mount 60 that connects to the first end 22 of a pivot arm 20, with a guide 64 mounted at the side of the pivot arm 20.

Shoulder bars 127A, 127B are part of the exit gate 128 (not shown) that are adapted to engage with the should of an animal (not shown) to keep the animal from exiting until treatment is complete, at which point the exit gate 128 can slide outward to move the shoulder bars 127A, 127B away from the animal and allow it to exit.

Shielding 103 extends across much of the side of the chute 80. It abuts or is connected to vertical support elements 107, 109 and helps ensure that there are no openings or pinch points along the sides of the chute 80 that might allow an animal to injure itself, although there is a front opening 101 through which an operator (not shown) may treat a front leg of the animal (not shown) with the aid of a grasper 210 (not shown) such as the grasper 210 of FIG. 4.

A lifting device 70, shown here as a hydraulic cylinder, is mounted above the pivot arm 20 and is attached to an upper portion of the chute's frame (not shown). A movable rod 72 can be retracted within the lifting device 70 to lift the pivot arm 20 or may be extended to allow the pivot arm 20 to go downward. The movable rod 72 in the version shown here is attached to the pivot arm 20 by a lifting device mount 76 or other connection means, which can be mounted at any suitable position along the pivot arm 20, including nearer or at the second end 24, if desired.

The second end 24 of the pivot arm 20 is joined to a belly band connection 50 that connects to and holds a belly band support 48 to connect to the end of a belly band 40 (not shown).

Also shown is an arc 150 showing the approximate path that the second end 24 of the pivot arm 20 may describe as the pivot arm 20 is lifted upwards from the initial position displayed in FIG. 5. This arc 150 initially moves away from the exit gate area 128 at the front of the chute, defining a distance D of backward motion relative to a vertical plane through the exit gate 128. This backward distance D roughly corresponds to the expected backwards distance the belly band may travel during the early stage of lifting, making it possible for the belly band to move away from the legs of the animal should the animal be standing on the band. The backward distance D may be at least any of the following: one-half inch (1.3 cm), one inch (2.5 cm), two inches (5 cm), and three inches (7.6 cm), and may range from one inch (2.5 cm) to twelve inches (30.5 cm), two inches (5 cm) to ten inches (25.4 cm), etc.

Figure 6:
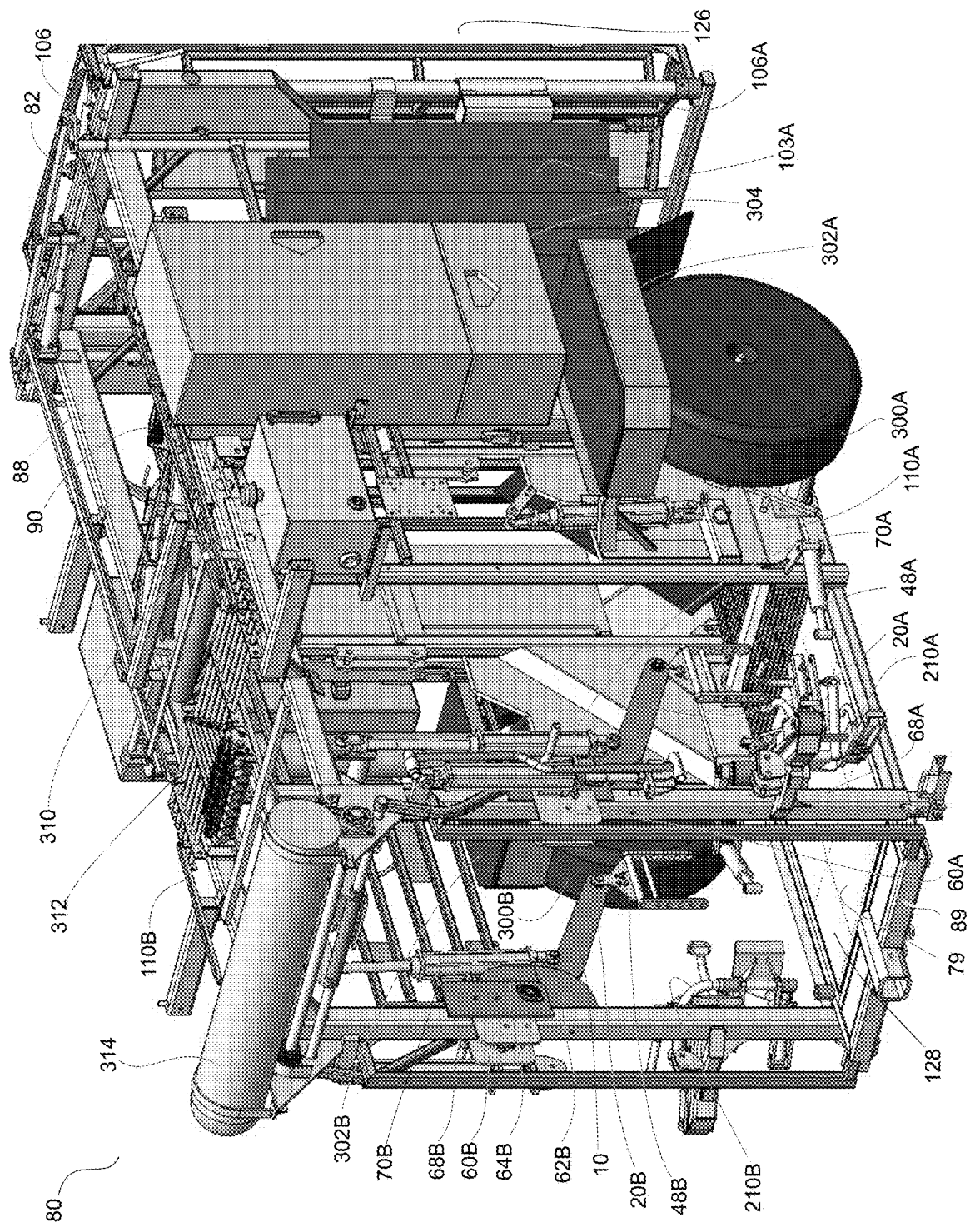
FIG. 6 is a perspective view of one version of a mobile chute for treating animals with a forward-mounted lifting system.

FIG. 6 depicts a perspective view of one version of a mobile trimming chute 80 comprising a frame 82 having a rear section 106 with an entrance gate 126, a front section 89 with an entrance gate 128 (doors not shown), a right side 110A, a left side 110B, wheels 300A, 300B mounted to the right side 110A and left side 110B, respectively, and associated with fenders 302A, 302B, having an upper portion 88 associated with a comealong 90, and further comprising a floor 79.

A lifting system 10 is adapted to lift an animal (not shown) by a bellyband (not shown) disposed between elements of the lifting device 10 on both sides 110A, 110B of the chute 80, including pivot arms 20A, 20B attached to belly band supports 48A, 48B and operatively associated with one or more lifting devices 70A, 70B adapted to pull the pivot arms 20A, 20B upwards as they pivot with respect to mounts 60A, 60B mounted on support members 68A, 68B at the front section 89 of the chute 80. In some versions, the belly band (not shown) can be lifted by contraction of the one or more lifting devices 70A, 70B that may be hydraulic cylinders, electric actuators, pulley systems, motorized winch-like devices (the winding of a winch cable here as a means of lifting is viewed as a form of contraction), etc.

During lifting, guides 62A, 62B near the mounts 60A, 60B may help guide the crosswise motion of the pivot arms 20A, 20B to provide some degree of controlled inward motion toward the centerline of the chute 80, wherein an upper portion 64A, 64B of the guides 62A, 62B may depart from vertical.

The support members 68A, 68B or other nearby structural units may also supports graspers 210A, 210B adapted to grasp the front legs of an animal (not shown) to assist an operator (not shown) in treating the animal.

Protective shielding 103A is partially visible for the left side 110A. Further shielding may be provided (not shown for clarity) along both sides to protect the animal. A tool box 302 may also be provided. Also shown is an accumulator 314 for use with the hydraulic systems of the chute 80, an oil box 310, linkages 312 for hydraulic lines, etc.

FURTHER DETAILS

In describing various aspects herein, it should be understood that every aspect or variation of each feature, element, method, process, system, and so forth, may be combined when feasible and suitable with any other such feature, element, method, process, system, and so forth.

Thus, by way of example only, the disclosure herein includes any of the following aspects:

Aspect 1. A chute for treatment of animals comprising having a frame with front, rear, upper, and side sections and a lifting system mounted on the front and/or upper sections of the frame, wherein a pivot arm mounted on the front section of the frame is adapted to cooperate with a lifting device attached to the upper section of the frame to lift an animal via a belly band attached to the pivot arm, wherein the pivot arm is raised by the lifting device pulling the pivot arm upwards, the chute further comprising protective side shielding along the side sections of the chute extending from the rear of the chute to a front lateral opening that provides access to a front leg of an anima for treatment.

Aspect 2. The chute of Aspect 1, wherein the protective side shielding is substantially free of openings larger than a 2-inch (5 cm) diameter circle or larger than a 3-inch (7.6 cm) diameter circle below a height of 24 inches (61 cm), 30 inches (76 cm), 36 inches (91 cm), 40 inches (102 cm), 44 inches (112 cm), or 48 inches (122 cm).

Aspect 3. The chute of any of Aspects 1-2, wherein the lifting system comprises at least one of a hydraulic piston and an electric actuator.

Aspect 4. The chute of any of Aspects 1-3, wherein the lifting system comprises an extensible and retractable rod which is retracted to lift the belly band.

Aspect 5. The chute of any of Aspects 1-4, wherein the belly band is connected to an end of the pivot arm via a belly band connection.

Aspect 6. The chute of Aspect 5 wherein a belly band support is connected to the belly band and to the belly band connection.

Aspect 7. The chute of any of Aspects 1-6, wherein the belly band has a width of at least 3 inches (7.6 cm), 4 inches (10 cm), 5 inches (13 cm), 6 inches (15 cm), or 7 inches (18 cm).

Aspect 8. The chute of any of Aspects 1-7, wherein the chute further comprises at least one grasper mounted on or near the front frame of the chute, wherein the grasper is adapted to engage with and restrain the front leg of an animal through the front lateral opening in order for an operator to treat the leg. (Here the term "treat the leg" comprises treating a hoof or other portions of the leg of an animal, such as trimming a hoof.)

Aspect 9. The chute of any of Aspects 1-8, further comprising at least one grasper mounted to the front of the frame for grasping a front leg securely and rotating it into place for treatment, wherein the grasper comprises two independently closable stages for restraining the leg of the animal.

Aspect 10. A method for hoof trimming, comprising guiding an animal into a chute, the chute comprising a belly band for supporting the animal, and at least one movable grasper for securing the lower leg of an animal, the belly band being in cooperative association with a lifting device that lifts the bely band by contraction of the lifting device.

Aspect 11. The method of Aspect 10, wherein the chute further comprises protective side shielding along the side sections of the chute extending from the rear of the chute to a front lateral opening that provides access to a front leg of an anima for treatment.

Aspect 12. The chute of Aspect 11, wherein the protective side shielding is substantially free of openings larger than a 2-inch (5 cm) or 3-inch (7.6 cm) diameter circle below a height of 24 inches (60 cm), 30 inches (76 cm), 36 inches (90 cm), 40 inches (100 cm), 44 inches (112 cm), or 48 inches (122 cm).

Aspect 13. The chute of any of the previous aspects, wherein the belly band is adapted to initially move toward the rear of the chute as it begins to rise from an initially lowered position.

Aspect 14. The chute of Aspect 13, wherein the pivot arm defines a path with an initial backward motion as it is lifted from an initially lowered position to a suitable height for animal treatment, wherein the extent of backward motion as projected onto a horizontal plane has a length of at least 0.5 inches (1.3 cm), 1 inch (2.5 cm), 2 inches (5 cm), 3 inches (7.6 cm), or ranges from 1 inch (2.5 cm) to 12 inches (30.5 cm) or from 1 inch (2.5 cm) to 10 inches (25.4 cm), etc.

Aspect 15. The chute of any of Aspects 1-14, further comprising wheels, a hydraulic accumulator, and a comealong.

Aspect 16. Methods of manufacture for the chute of any of Aspects 1-15, which may comprises original manufacture of a new chute or retrofitting or converting an existing chute to provide one or more of the features describes herein, particularly one or more of (1) an animal lifting system which imparts a relatively backward motion of the belly band in the initial stages of the lifting of the animal, (2) an animal lifting system which lifts an animal by pulling a belly band from above the ends or attachment points of the belly band rather than pushing upwards from below the ends or attachment points of the belly band; and (3) an animal lifting system comprising a lifting device which lifts the belly band by contraction rather than by extension.

In some versions, the cattle chute may be equipped with a variety of sensors and may also be in cooperation with external sensors. The sensors may be inside or outside the chute, either directly mounted on the chute or its peripheral components or may be remote but in communication with a control system for the chute, with communication occurring through radio or other wireless signals (WIFI, 5G, etc.), cable, etc. External sensors include those that can monitor conditions of animals to determine if special treatments are needed, to measure the quality of the treatment by examining one or more factors both before and after the treatment, etc. Such sensors may be used to monitor animals wherever they are, indoors or outdoors, and may be adapted to recognize and track individual animals. For example, for a herd of dairy cows, load distribution platforms may be provided in the return lane from the milking parlor to regular track cows daily, combined with optical sensors to read tags and optionally to track gait or other signs of pain or other problems.

In general, such sensors and systems, for use with the chute or for use external to the chute may include:

Cameras and related optical systems for analyzing hoof thickness, leg health, regions of the hoof or leg in need of treatment, etc. The cameras may be integrated with individual animal recognition systems, akin to human facial recognition and gait recognition systems, or may cooperate with RFID tag systems or other tagging systems (e.g., optical detection of data on a conventional ear tag), thereby allowing observations of skin health, signs of injuries, etc., to be tracked over time for individual animals. Cameras and other sensors may be combined to give automated or semi-automated scoring of locomotion using any known locomotion index system.

Systems for analyzing bone location and characteristics, which may include x-ray systems, ultrasonic systems, fluorometers, tissue penetrating radar or microwave imaging systems, MRI, etc. A goal of hoof trimming in many cases is to align the horn of the external hoof with the interior bone, and such instrumentation could be helpful in guiding trimmers and assessing the quality of trimming. Results can be stored in databases for individual animals and may include tracking the work and efficiency of individual trimmers.

Gait sensors (particularly systems comprising cameras) that can monitor characteristics of an animal's motion when walking, such as gait cycle duration, stance, swing phases, motion of individual legs, shoulder and back motion, etc., which may provide data about balance, distribution of weight, sensitivity of the hooves or legs or the presence of pain, mood or overall health, etc. Such data can be integrated with load distributions data from load cells, hoof imprints, and other means to enable analysis of the walking and standing characteristics of individuals animals in ways that relate to hoof health and leg health in order to guide trimmers and others in providing the optimum care.

Facial recognition systems and body recognition systems adapted for the animals of concern. For example, the state of a cow's back may be indicative of the pain a cow faces, with a flat back being indicative of good health and a more arched back indicative of pain. Pain or other problems may also be reflected in facial characteristics. Interpretation of data may require machine learning systems or artificial intelligence that considers the broad variety of data pertaining to animals and their care in order to give recommendations to trimmers and other managers or care providers.

Accelerometers and related devices that can be mounted on animals to observe walking characteristics, or that may be mounted on floor panels to analyze step characteristics.

Step counting systems, including motion detectors, load cells, accelerometers, cameras, etc., to detect cow motion such as steps taken while standing on a platform, which can be a measure of pain.

Load cells and networks of load cells to form a weight distribution measurement platform or force and pressure platforms can be used to measure load distribution under the legs of the animal both while walking or while standing still, or to measure the load under a single hoof with relatively high spatial resolution.

Systems incorporating data from various sensors may employ decision-making systems to interpret data and give guidance to trimmers or other caregivers. For example, one or more sensors may obtain data for a given animal and may also obtain identity information from a tag or other means to identify the animal. The data is then processed by a processor using algorithms to determine if the animal, in light of the data, is facing health or pain issues that may require treatment by a trimmer. The processor interprets the data and may apply additional data from a database, such as historic information on the health of the animal to detect noteworthy changes, and the make a judgment about recommended treatment that may be needed or issues that should be checked by a trimmer. If the issues are serious, the animal may be culled ahead of the normally scheduled trim for immediate assistance in light of the issues identified based in the data, or, during the next scheduled trim, the recommendations for action based on the data may be communicated to the trimmer to guide proper care and maintenance in light of apparent problems that were detected. Results and recommendations can also be stored in a database for future tracking of animal characteristics and health to determine the efficacy of the trimmer's work, etc., and to guide further future steps.

REMARKS

When introducing elements, the articles "a," "an," "the," and "said" are intended to mean that there are one or more of the elements, and thus may include plural referents unless the context clearly dictates otherwise. The terms "comprising," "including," and "having" are intended to be inclusive and mean that there may be additional elements other than the listed elements.

Unless otherwise specified, all patents and patent applications mentioned herein should be understood to be hereby incorporated by reference to the extent they are non-contradictory herewith. Further, all aspects of any portion of the disclosure may be, when not clearly improper, combined with any other aspect, such that any limitation in one claim or other aspect can be inherently available for combination with other aspects and limitations.

Having described various aspects of the disclosure in detail, it will be apparent that modifications and variations are possible without departing from the scope of the appended claims. As various changes could be made in the above compositions, products, and methods without departing from the scope of the various aspects as claimed, it is intended that all matter contained in the above description shall be interpreted as illustrative and not in a limiting sense.

While the foregoing description makes reference to particular illustrative examples, these examples should not be construed as limitations. The inventive system, methods, and products can be adapted for other uses or provided in other forms not explicitly listed above, and can be modified in numerous ways within the spirit of the present disclosure. Thus, the disclosure are not limited to the specific examples or other details, but is to be accorded the widest scope consistent with the claims below.

We claim:

1. A chute for treatment of an animal comprising: a frame with front, rear, upper, and side sections and a lifting system, the lifting system comprising a pivot arm having a first end rotatably mounted on the front section of the frame and attached to a belly band, wherein the pivot arm cooperates with a lifting device attached to the upper section of the frame to lift the animal via the belly band, wherein the pivot arm is raised by the lifting device pulling the pivot arm upwards, the chute further comprising protective side shielding along the side sections of the chute extending from the rear section of the chute to a front lateral opening that provides access to a front leg of the animal for treatment.

2. The chute of claim 1, further comprising at least one grasper mounted to the front section of the frame for grasping a front leg securely and rotating it into place for treatment.

3. The chute of claim 1, wherein the protective side shielding is substantially free of openings larger than a 2-inch diameter circle below a height of 30 inches.

4. The chute of claim 1, wherein the belly band has a width of at least 4 inches and wherein the animal being treated is a cow.

5. The chute of claim 1, wherein the chute further comprises at least one grasper mounted on or near the front section of the chute, wherein the at least one grasper is adapted to move in or through the front lateral opening and to restrain the front leg of an animal.

6. The chute of claim 1, wherein the chute has a center line extending between the rear section and the front section of the chute, the chute further comprising a guide attached to the frame of the chute adjacent to the pivot arm, the guide having a portion thereof at an angle away from vertical adapted to direct the lateral motion of the pivot arm as it is raised to lift an animal, and such that the pivot arm shifts toward the center line of the chute.

7. The chute of claim 1, wherein the belly band is adapted to initially move toward the rear section of the chute as it begins to rise from an initially lowered position.

8. The chute of claim 1, wherein the protective side shielding is substantially free of openings larger than a 2-inch diameter circle below a height of 36 inches.

9. The chute of claim 1, wherein the protective side shielding is substantially free of openings larger than a 3-inch diameter circle below a height of 44 inches.

10. The chute of claim 1, further comprising wheels and a hydraulic accumulator.

11. The chute of claim 1, wherein the lifting device lifts the belly band by contraction.

12. The chute of claim 1, wherein the lifting system comprises at least one of a hydraulic piston and an electric actuator.

13. The chute of claim 12, wherein the lifting system comprises an extensible and retractable linkage which is retracted to lift the belly band.

14. The chute of claim 1, wherein the belly band is connected to an end of the pivot arm via a belly band connection.

15. The chute of claim 14, wherein a belly band support is connected to the belly band and to the belly band connection.

16. The chute of claim 1, wherein the pivot arm defines a path with an initial backward motion as the belly band is lifted from an initially lowered position to a suitable height for animal treatment, wherein the extent of backward motion as projected onto a horizontal plane has a length of at least 0.5 inches.

17. The chute of claim 16, wherein the extent of backward motion as projected onto a horizontal plane has a length of at least 2 inches.

18. A method for hoof trimming, comprising: (1) guiding an animal into a chute, wherein the chute comprises a frame with front, rear, upper, and side sections and the frame comprises a lifting system having a pivot arm with a first end rotatably mounted on the front section of the frame and attached to a belly band, (2) lifting the animal by the belly band, wherein the pivot arm cooperates with a lifting device attached to the upper section of the frame, such that the pivot arm is raised by the lifting device pulling the pivot arm upwards to raise the belly band, and (3) grasping a front leg of the animal with a movable grasper, wherein the side sections comprise two opposing sides with protective shielding and a front lateral opening to permit treating of the front legs of the animal.

19. The method of claim 18, wherein the protective shielding on each side is substantially free of openings larger than a 2-inch diameter circle below a height of 24 inches between the entrance of the chute to the front lateral opening.

20. The method of claim 18, wherein the belly band is adapted to initially move backwards toward the rear section of the chute by at least 1 inch as it is lifted.

* * * * *